United States Patent [19]

Meyering et al.

[11] Patent Number: 4,579,698
[45] Date of Patent: Apr. 1, 1986

[54] PROCESS FOR PRODUCING A MICROPOROUS POLYMERIC FILTER MEMBRANE WITH ADJACENT NON-POROUS EDGE LAYERS AND A PLEATED FILTER ELEMENT FORMED FROM THE MEMBRANE

[75] Inventors: Mark T. Meyering, Middlefield; Eugene A. Ostreicher, Farmington, both of Conn.

[73] Assignee: AMF, Inc., White Plains, N.Y.

[21] Appl. No.: 700,784

[22] Filed: Feb. 12, 1985

Related U.S. Application Data

[62] Division of Ser. No. 383,383, May 28, 1982, abandoned.

[51] Int. Cl.⁴ .................. C08J 9/28; B29C 67/20
[52] U.S. Cl. .................. 264/41; 210/433.2; 264/45.1; 264/45.5; 264/255; 264/286; 264/322; 264/DIG. 48
[58] Field of Search .............. 264/41, 45.1, 45.8, 264/289, 286, 322, DIG. 48; 210/433.2

[56] References Cited

U.S. PATENT DOCUMENTS 3,457,339 7/1979 Pall et al. ..................... 264/162
3,865,919 2/1975 Pall et al. ..................... 264/259
3,873,254 3/1975 Warwicker ..................... 264/41 X
3,876,738 4/1975 Marinaccio et al. ............ 264/41
4,392,958 7/1983 Ganzi et al. ............... 264/DIG. 48

*Primary Examiner*—Philip Anderson
*Attorney, Agent, or Firm*—Ostrolenk, Faber, Gerb & Soffen

[57] ABSTRACT

A filter element comprising a hydrophilic organic polymeric microporous filter membrane having a preformed substantially non-porous sealing area and a filter housing having, preferably, a hydrophobic thermoplastic sealing surface in thermoplastic sealing relationship with the sealing area. Preferably, the filter membrane is a pleated cylindrical membrane and the housing includes endcaps thereto. The preferred membrane is nylon.

The preferred pleated cylindrical membrane is produced from an elongated porous filtration area longitudinally bordered by substantially non-porous sealing areas. Such a membrane may be produced by a specific casting method or collapsing the pores along the longitudinal borders of the filtration area. The filter element is particularly useful for the filtration of aqueous liquids, particularly parenteral or body liquids.

14 Claims, 7 Drawing Figures

PROCESS FOR PRODUCING A MICROPOROUS POLYMERIC FILTER MEMBRANE WITH ADJACENT NON-POROUS EDGE LAYERS AND A PLEATED FILTER ELEMENT FORMED FROM THE MEMBRANE

This is a division of co-pending application Ser. No. 383,383, filed May 28, 1982 and now abandoned.

RELATED APPLICATION

This application describes and claims a generic invention, a preferred subgenus of which is described and claimed in concurrently filed U.S. Ser. No. 383,377 to Miller, the entire disclosure of which is incorporated herein by reference.

FIELD OF THE INVENTION

This invention relates to filter elements utilizing hydrophilic microporous membrane as the filtration media, and more particularly to filter elements utilizing cylindrical pleated membrane, said filter elements being suitable for the filtration of aqueous fluids, in particular parenteral or body liquids.

PRIOR ART

In many applications it is necessary to totally remove particles having dimensions in the submicrometer range. For this purpose, it is well known in the art to use a thin polymeric layer that is rendered highly porous with a substantially uniform pore size. Such layers are commonly termed microporous filtration membrane.

One characteristic of such microporous filter membrane is that they are extremely fragile and easily rupture when subjected to deformation due to rough handling, bending, or fluid pressure. Since even the most minute crack or break will destroy the effectiveness, it is necessary to use extreme care in manufacture and use.

Microporous filter membrane find many uses in industry, science and education. A common industrial application is the "cold" sterilzation of pharmaceuticals and the stabilization of alcoholic beverages. In cold sterilization, the membrane has a sufficiently small pore size to block the passage of all bacteria present in the unfiltered fluid supplied to the upstream side. In the production of alcoholic beverages, the removal of bacteria, yeast and molds, stabilizes and clarifies the beverage. In the production of pharmaceuticals, the removal of bacteria is an essential step for obvious health reasons. In all of these applications it is essential that the filter membrane used be hydrophilic in order to filter such aqueous fluids.

There are many types of filter membranes available and processes for producing such membrane.

Nylon microporous filter membrane is well known in the art, for example, U.S. Pat. No. 3,876,738 to Marinaccio et al (1975) describes a process for preparing nylon microporous membrane by quenching a solution of a film forming polymer in a non-solvent system for the polymer. European Patent Application No. 0 005 536 to Pall (1979) describes a similar type process for producing nylon membrane.

Other type polymeric microporous membranes, including nylon and processes for producing such membranes are described, for example in the following U.S. Pat. Nos.:
3,642,668 to Bailey et al (1972);
4,203,847 to Grandine, II (1980);
4,203,848 to Grandine, II (1980), and
4,247,498 to Castro, (1980).

Commercially available nylon microporous filter membranes are available from Pall Corp., Glencove, N.Y., under the trademark ULTIPOR $N_{66}$ and $N_{66}$ POSIDYNE. Another commercially significant filter membrane made of polyvinylidene fluoride is available from Millipore Corp., Bedford., Mass., under the trademark DURAPORE. This membrane is probably produced by the aforementioned Grandine, II patents.

Additionally, the Assignee of this application is selling cationically charged modified nylon microporous filter membrane under the trademark ZETAPOR. These membranes are described and claimed in U.S. Ser. No. 268,543 filed on May 29th, 1981 to Barnes et al, now U.S. Pat. No. 4,473,475; and U.S. Ser. No. 314,307 filed on Oct. 23, 1981 to Ostreicher et al, now U.S. Pat. No. 4,473,374. Barnes et al describes the use of charged modified membrane for the filtration of high purity water (18 megohmcentimeter resistivity) used in the electronics industry; and Ostreicher et al describes the use of charged modified membrane for the filtration of parenteral or body liquids. Additionally, it should be noted that these filter membranes are typically reinforced by various means. A unique method of reinforcement is described in the Assignee's U.S. Ser. No. 332,068, filed Dec. 18, 1981 to Barnes et al, now abandoned.

All of the aforementioned membranes, besides being used in sheet form, are used in various type filter elements. Generally, the filter element comprises the filter membrane and a filter housing with a sealing surface in sealing relationship with a sealing area of the membrane. A well known type filter element is the pleated cartridge type filter element described, for example, in U.S. Pat. No. 3,457,339 to Pall et al (1969). Another well known type of filter element is the hermetically sealed intravenous unit described in U.S. Pat. No. 4,113,627 to Leason (1978).

In the critical applications for such filter elements, it is imperative that the filter membrane not be damaged during production and that the filtrate not bypass the filter membrane. Either situation could be catastropic, for example, allowing contaminants to enter the blood stream of a patient. It is therefore necessary that an undamaged seal exist between the sealing area of the membrane and the sealing surface of the filter housing to prevent leakage around the filter membrane. In order to insure such integrity, the filter element is "integrity tested" to insure the integrity of the filter element. This is generally accomplished by a "bubble point" test of the filter element by methods well known in the art. A particular type of integrity testing device for filter cartridges is commercially available under the name ZETAWATCH, from AMF Cuno Division, Meriden, Conn. and described and claimed in the Assignee's co-pending U.S. Ser. No. 265,481, filed May 20, 1981, to Kowalski, now U.S. Pat. No. 4,384,474. This integrity tester is self contained and electrically monitors the individual cartridge element's integrity within a multiple cartridge housing. Other methods of such integrity testing are described in "Non-Destructive Test For Bacterial Retentive Filters" by Ben Trasen which was published in the September/October 1979 issue of the Journal of Parenteral Drug Association, pages 273-2798. All of the known integrity tests require a thorough wetting of the membrane and sealing surfaces associated therewith to provide an accurate determination of integrity. If the filter membrane is broken, even microscopically, if the membrane is improperly installed, or if the membrane sealing surfaces are not completely wetted, bubbles will appear immediately at the point of the break or leak.

Additionally, any filter element must, particularly when used to filter parenteral or biological liquids, have a minimum of extractable contaminants introduced into the filtrate. These contaminants may be harmful toxins when introduced into a patient. Specifically, any filter element must meet the test standards of the industry, e.g. ASTM D-3861-79.

Still further, filter elements used to filter parenteral or biological liquids should be heat sterilizable and autoclavable, without deterioration or discoloration of the housing or membrane or deterioration of the seal between the membrane and housing. A preferred housing material is polypropylene which is hydrophobic.

Several methods of sealing filter elements have been employed in the past. These methods include pressure clamping, heat sealing, ultrasonic welding, adhesive and solvent bonding, and injection molding. These prior art methods fail to provide on occasion the 100% positive seal which is necessary to prevent leakages. In particular where microporous filter membranes are used in the filter element, there is some danger when using these methods that the delicate filter media will be damaged during the sealing process.

Known methods of pressure clamping and other mechanical interlocking systems tend to distort the filter membrane or actually damage the membrane at the clamping edges, thereby destroying the integrity of the membrane and allowing contaminants to pass through. Also conditions such as time, and heat stress relieving can allow the pressure seal to relax. Additionally, this method is particularly complicated when a pleated filter cartridge is assembled. Known methods of heat sealing, sonic welding and related thermomechanical bonding methods may also damage the filter membrane at the sealing edges. The use of adhesives or solvent bonding has disadvantages in that another material is introduced into the filter element that can lead to extractable contaminants. Often the constituents of an adhesive or solvent system may also damage the filter membrane.

The foregoing methods of sealing the filter housing to a filter membrane are troublesome when a hydrophobic sealing surface is in contact with a hydrophilic sealing area. This is often the case when the filter element is used to filter biological or parenteral liquids where it is very highly desirable to use a polypropylene housing, (which is resistant to autoclaving and heat sterilization) and undesirable to use adhesives or solvents for sealing (to avoid high extractables). For such elements, the housing is usually thermoplastically sealed to the membrane, increasing the chances for damage to the sealing areas of the membrane. Additionally, it appears that the hydrophobic sealing surface of the housing in contact with the porous hydrophilic sealing area of the membrane increases the chances that the filter element will not pass industry integrity tests. This is probably brought about by the incomplete wetting of the membrane/housing interface which gives a reduced bubble point. For example, it has been found that in the thermoplastic sealing of polypropylene end caps to cylindrical pleated nylon membrane filter cartridges an unacceptably low percentage of the cartridges passed the industry integrity test.

More specifically, the following prior art references are relevant to the invention described and claimed herein.

U.S. Pat. No. 1,476,392 to Carroll (1923) describes a process of making a composite film by casting a plastic or flowable cellusoic material, e.g. cellulose acetate, on to a moving wheel from a plurality of compartments to thereby produce a plurality of adjacent film strips. This reference does not teach or suggest the production of a microporous filter membrane.

U.S. Pat. No. 2,663,660, to Layte (1953) describes a method of assembling filter elements, e.g. a filter cartridge, by producing an elongated strip of filter paper and folding elongated tapes of adhesive material on the elongated edges. The filter paper is then cut to size and pleated transversely of the length of the strip, and rolled into an annulus form. The outer portions of the adhesive tape material is then moistened with a suitable solvent material for the adhesive material of which the tapes are formed and thereafter the ends of the annulus are capped by end caps. The end caps are preferably heavy cardboard. Layte does not teach or suggest the use of such a method in conjunction with microporous membrane nor is such a method suitable for producing filter cartridges for filtering parenteral or biological liquids wherein extractables must be minimized.

U.S. Pat. No. 3,013,607, to Jackson et al (1961) relates to a method of end capping tubular filter elements of paper, cardboard, felt, woven tissue, etc. Thermoplastic end caps are subjected to heat induced in the field of an electric inductance coil in contact with the cap, to a point where the cap is softened so that the edges of the filter can be embedded in the cap to the depth required to bind the parts together. A metallic strip is applied to the edges of the filter and external support jacket, or the edges of the filter element and external support jacket are coated with an electrically conductive or semiconductive material, so as to reinforce the filter edges, and enhance the heat conductivity through the edges and end cap. Jackson et al does not utilize an organic polymeric microporous filter membrane and thus does not recognize the problems associated with the integrity testing of filter elements containing such hydrophilic membrane in conjunction with a hydrophobic end cap.

Additionally, the use of a metalic strip on the edges of the Jackson et al filter limits greatly the application to which the end capped filter elements can be put. For example, under certain conditions, the metallic strip can corrode and/or contaminate the material being filtered or the medium being filtered. Such a filter element is completely unacceptable for the filtration of biological and parenteral liquids. Still further the use of such a metalic strip on the edges of the filter elements increases the cost of making the filter elements, and complicates the procedure used in corrugating such filter elements.

U.S. Pat. No. 3,407,252 to Pall et al (1968) describes the production of a corrugated or pleated filter media in annulus form which utilizes a ribbon or tape of bonding agent such as a heat sealable and curable epoxy resin, to form a leak-proof seal along the longitudinal meeting of the pleated filter media.

U.S. Pat. No. 3,457,339 to Pall et al (1969) describes a process for applying preformed end caps to filter sheet material, particularly sheet materials formed of fiber and in substantially tubular shape. The process involves heating the inside face of the thermoplastic end cap to fuse a portion of the cap into a liquid. The liquid is of a viscosity which is capable of penetrating through the pores of the filter sheet. The edges of the cylindrical sheet are then embedded in the liquified end cap so that the liquidified thermoplastic material penetrates through the pores of the embedded portions of the filter sheet material from one surface to the other. The liquid plastic is then hardened and said to form a substantially continuous leak proof matrix of end cap material permeating through the pores of the filter material and bonding the filter sheet to the end cap in a leak proof seal.

This process for applying end caps to a filter sheet has the advantage in that it does not require the use of adhesives. If this Pall et al process, however, is utilized using end caps of a hydrophobic material and hydrophilic membrane, an excessive percentage of the cartridges do not pass the industry integrity test. It is believed that this is due to the cartridge not being completely wetted at the interface between the hydrophilic membrane and the hydrophobic end cap. Hydrophobic type end caps may be utilized if the cartridge is integrity tested in a non-aqueous solvent. This, however, limits the application of the filter element. If a hydrophilic type end cap, e.g. polyester, is used, the cartridge will generally have inferior solvent and chemical resistance and inferior resistance to autoclaving and heat.

This Pall et al process requires that the sealing areas of the filter sheet material be porous to permit penetration of the liquified thermoplastic material through the pores of the embedded portion of the filter sheet material from one surface to the other. Additionally, during prosecution Pall et al states:

" . . . The instant process is simple enough to enable rapid manufacture of filter elements with a minimum of manufacturing steps and without the necessity of employing bonding agents and components other than the actual materials of the filter and end cap . . . ."

In effect Pall et al teaches away from Applicant's invention which utilizes a substantially non-porous sealing area and which may, in its preferred embodiment, utilize other components than the actual materials of the filter and end cap.

U.S. Pat. No. 3,471,019 to Trasen et al (1969) describes a filter unit comprised of a two-part housing provided with sealing portions adapted to be aligned with each other and with a peripheral portion of the filter completely surrounding the central portions of the filter. In assembly of the unit, the sealing portions of of the housings are pressed against the opposite sides of the filter and the sealing portion of at least one of the parts of the housing is heated to cause the material thereof to melt and flow through the aligned pores of the peripheral portions of the filter and fused to the sealing portion of the other part of the housing. A similar type filter and sealing method is described in U.S. Pat. No. 3,782,083 to Rosenberg (1974) wherein the plastic material runs through the pores of the filter element forming a fluid tight integral seal closing all sides of the element to fluid flow.

U.S. Pat. No. 3,487,943 to Buckman (1967) describes a filter element made of pleated filter paper. One portion of the filter element is modified so that in operation of the filter the liquid flow velocity through the modified portion is less than that through the remainder of the element. The modified portion may be formed by compressing together a series of pleats or by sealing to a group of pleats on one side of the element a sheet of similar or dissimilar filter material. The similar or dissimilar filter material is sealed to the annulus cartridge over the inner or outer periphery of the cartridge and does not form a continuous edge along the top of the filter near the end cap.

U.S. Pat. No. 3,591,010 to Pall et al (1971) describes a corrugated element having a microporous layer deposited on a substrate sheet provided with portions of reduced porosity at the areas of the base folds of the corrugations.

U.S. Pat. No. 3,815,754 to Rosenberg (1974) describes a box filter wherein the elements of the filter housing are bonded to the filter sheet by fused integration of the housing members through the open pores of the filter element, forming a fluid tight seal all along the sides of the filter sheet. Such a bond is obtained by, for example, ultrasonic welding, solvent softening or heat fusion.

U.S. Pat. Nos. 3,865,919 and 3,867,294 to Pall et al (1975) describe cylindrical elements having an improved side seam seal which can be bonded to end caps in a leak type manner.

U.S. Pat. No. 3,954,625 to Michalski (1976) describes a filter which includes a plastic housing and an intermediate filter screen. The peripheral portion of the screen is sealed between the two housing halves by flowing a portion of at least one of the housing halves through the screen and bonding that portion to the other housing half.

U.S. Pat. No. 4,101,423 to Merrill et al (1978) describes a tubular filtration element whose ends are impregnated with a suitable sealing adhesive. When the adhesive material cures, the end portion provides mechanical support for the tube and blocks the passage of the fluid or the particulate and bacterial contaminant. Merrill et al requires that the sealing material used to form the ends must be hydrophilic when cured, stating:

"If the sealant rendered the filter adjacent to it hydrophobic, the filter would not be wetted and would not then offer capillary resistance to the bubble point test gas, therefore the bubble point could not be used as an indication of filter integrity . . . " (Col. 9, lines 59–64).

"It will be understood that if the outer layer (of the filter) is formed from a lacquer impregnated paper, the resilient members can safely apply a sealing force sufficient to block the fluid from the end portions so that a hydrophobic sealing material may be used." (Col. 10, lines 6–10).

The filtration element is supported and sealed within a housing by radial seal force, i.e. the filtration element and housing are not in thermoplastic sealing relationship to each other.

U.S. Pat. No. 4,154,688 to Pall (1979) describes the use of thermoplastic end cap applied to the open ends of a filtered tube in accordance with the aforementioned U.S. Pat. No. 3,457,39 to Pall et al.

U.S. Pat. No. 4,193,876 to Leeke et al (1980) describes dryforming the peripheral portion of discs of filter media, particularly filter media containing non-compressable particulate to suppress edge leakage in filter presses.

In assignee's U.S. Ser. No. 253,345 to Southall, filed Apr. 13, 1981, now U.S. Pat. No. 4,347,208, a method is described of making a filter cell comprised of two cellulosic fiber containing filter media having a sealed periphery. The method comprises compressing the periphery of each filter media to form a flange. The media are then aligned to provide intimate face to face contact between the flanges and a spacer means provided between the media to cause each to dish outwardly from the other media. The media and spacer means are then placed into a mold surrounding the flanges. The mold has a means for providing a recompression force to the inner portions of the flanges. A thermoplastic polymer is then injected into the mold to form a seal around the flanges.

Additionally, MICRO-SCREEN filter cartridges are commercially available from AMF Cuno Division, Meriden, Conn., comprising a stainless steel pleated cylindrical screen welded to stainless steel end caps. Shim stock is welded to the screens at both ends to effectively seal off the end so that the end caps can be welded thereon without destroying the filter screen thereunder.

In summary, all of the prior art uncovered by applicant relating to sealing filters, generally requires that the filter media sealing area be porous, so that when a thermoplastic or sealing surface is applied thereto it flows through the porous media to effect the seal.

OBJECTS AND SUMMARY OF THE INVENTION

It is an object of this invention to provide filter element which has an effective seal between a hydrophilic membrane and the sealing surface of the filter housing.

It is a further object of this invention to provide an effective seal without the use of adhesives.

It is still a further object of this invention to provide a filter element which is particularly useful for the filtration of aqueous fluids, in particular biological and parenteral liquids.

It is yet another object of this invention to provide a filter element comprising a fragile microporous filter membrane in cylindrical form which has toughened ends permitting the ends to be embedded in an end cap without damage to the ends and/or sealing integrity of the filter element.

It is still another object of this invention to provide a filter membrane for use in the filter element of this invention.

It is a further object of this invention to provide novel processes for producing the filter elements and filter membranes of this invention.

In accordance with the present invention, a filter element is provided which comprises:

(a) a hydrophilic organic polymeric microporous filter membrane having a preformed substantially non-porous sealing area;

(b) a filter housing having preferably a hydrophobic thermoplastic sealing surface in thermoplastic sealing relationship with the sealing area.

Preferably the filter membrane is in pleated cylindrical form having the non-porous sealing areas at each end of the cylinder and the housing having an end cap at each end of the cylinder.

The filter membrane used in the aforementioned preferred filter element comprises an elongated porous filtration area longitudinally bordered by the substantially non-porous sealing areas. This filter membrane is produced by a novel simultaneous casting and quenching method which simultaneously produces the filtration area and non-porous sealing areas. The filter membrane used may also be produced by preparing the filter membrane by known methods and then collapsing the pores along the longitudinal borders of the filtration areas.

The filter elements of this invention are useful for the filtration of aqueous liquids, particularly parenteral or body liquids.

DETAILED DESCRIPTION OF THE INVENTION

Figure 1:
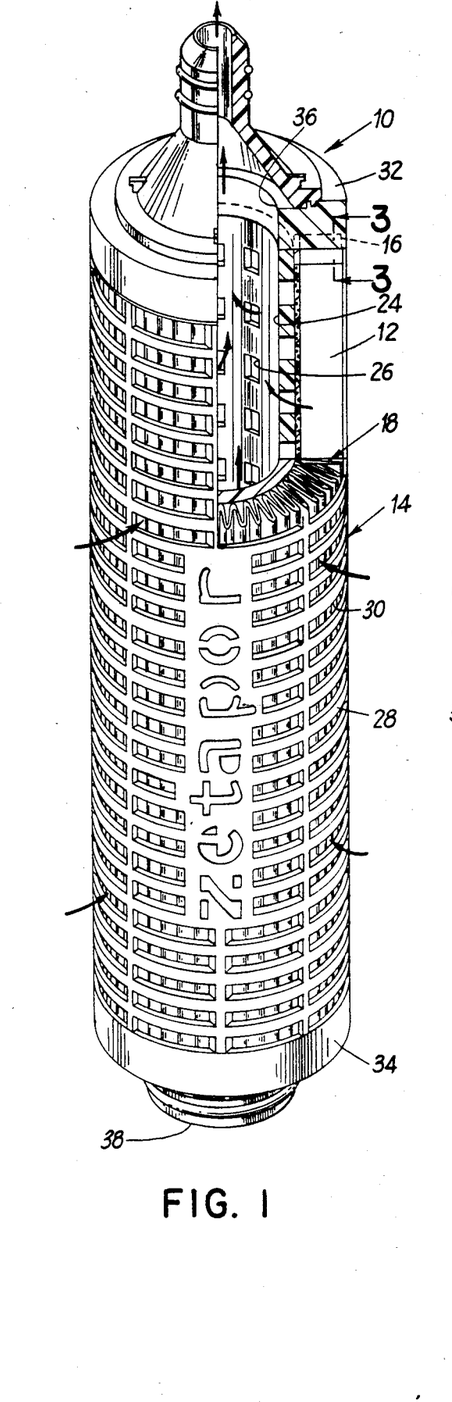
FIG. 1 is a perspective view, partially broken away, of a preferred filter element of this invention.
Figure 2:
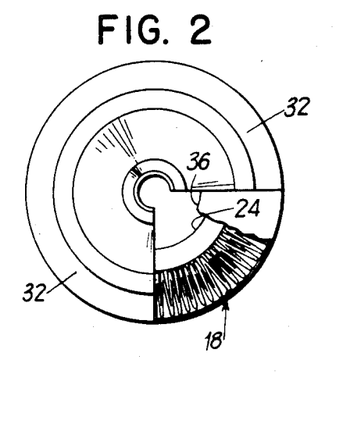
FIG. 2 is a top view, partially in section, of the filter element of FIG. 1.
Figure 3:
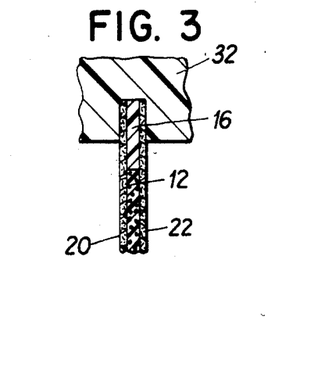
FIG. 3 is an enlarged view in section, taken along line 3—3 of FIG. 1 depicting the sealing surface between the membrane and filter element.

FIGS. 1 through 3 depict a preferred embodiment of the filter element of this invention. The filter element, generally designated (10) is comprised of the filter membrane (12) and the filter housing, generally designated (14). The filter membrane is in cylindrical form having the substantially non-porous area (16) at each end of the cylinder (18). Referring to FIG. 3, the filter membrane (12) is sandwiched between inner and outer layers (20) and (22) of, for example, polypropylene woven netting.

The composite of filter membrane (12) and inner and outer layers (20 & 22) is pleated transversely to its length and formed into cylinder (18). The cylinder (18) is then slipped over a foraminous cylindricl core (24) which is provided with apertures (26) for flow into the open interior of the core (24). The filter membrane (12) and core (24) are then slipped into an outer cylindrical member (28) which is also provided with apertures (30). The ends of the cylinders are then capped by end caps (32 & 34).

The end caps (32&34) are sealed by thermoplastic fusion to the non-porous areas (16) of the filter membrane (12). The end caps (32&34) close off the interior from the exterior of the filter element. The fluid can thus flow from the outside to the interior of the filter element, since interior and exterior are completely separated by the filter element and sealed off by the end caps (32&34). The end caps (32&34) each have a central aperture (36&38).

The preformed end caps (32 & 34) are preferably applied to the cylindrical membrane (18) by heating an inside face of the thermoplastic end cap to a temperature sufficient to soften and preferably not liquify, a sufficient amount of the end cap to form a thermoplastic seal with the non-porous area at each end of the cylinder. All of the edges of one end of the cylinder are them embedded into the softened end cap. The softened end cap material is then hardened, typically by ambient conditions, to form a thermoplastic sealing relationship between the sealing surface of the end cap and nonporous area thereby forming a leak proof seal.

A method of applying end caps to filter elements is described in the aformentioned U.S. Pat. No. 3,457,339 to Pall et al. Such a method and apparatus described therein may be modified to apply end caps in this invention. The major differences between the method used in this invention and the Pall et al method, is that Pall et al liquifies a portion of the end cap which permeates through the porous sealing surface of the filter membrane; whereas Applicants preferably do not require liquefaction of the sealing portion of the end cap because the sealing surface of the membrane is non-porous.

End caps of thermoplastic materials are preferred because of the ease of bonding, but it is also possible to use thermosetting resins in a thermoplastic, fusable or heat softenable stage of polymerization, until the bondings have been effected, after which the curing of the resin can be completed to produce a structure which can no longer be separated. Such a structure is autoclavable without danger of destroying the fluid tight seal between the housing portions and the filter membrane and the end caps. Thermoplastic resins whose softening point is sufficiently high so that they are not softened under sterlizing autoclaving conditions are preferred for medical use. Exemplary of the plastic materials which can be used are polyolefins (polyethylene, polypropylene, polybutylene, polyisobutylene), polyamides, polyvinylchloride, polyvinylidene chloride, polyacrylonitrile, polyesters, polycarbonates, polymethacrylate, polyaallyl, and polyoxymethylene resins. Polytetrafluoroethylene and polytrifluorochloroethylene also can be used. Polypropylene is preferred for the filtration of biological liquids in that it can withstand autoclaving and sterlizing without discoloration or distortion. Other type materials, which may be hydrophilic are generally unsuitable for such uses due to discoloration, distortion, etc., however they may be used in conjunction with the membrane of this invention for other uses.

The hydrophilic organic polymeric microporous filter membranes used in the filter element of this invention are well known in the art.

By the use of the term "microporous membrane" as used herein, it is meant a porous single layer, multiple layer or reinforced single or multiple layer membrane, having an effective pore size of at least 0.1 microns or larger or an initial bubble point (IBP), as that term as used herein, in water of less than 90 psi. A maximum pore size used for such membrane is preferably about 1.2 microns or an IBP or greater than 8 psi. Preferably, but not necessarily, a single layer membrane is substantially symmetrical and isotropic. By "symmetrical", it is meant that the pore structure is substantially the same on both sides of the membrane. By the use of the term "isotropic", it is meant the membrane has a uniform pore structure throughout the membrane.

The microporous membranes used in this invention are hydrophilic. By the use of the term "hydrophilic", in describing the membranes, it is meant a membrane which adsorbs or absorbs water. Generally, such hydrophilicity is produced by the presence of a sufficient amount of hydroxide (OH—) carboxyl (—COOH), amino (NH$_2$) and/or similar functional groups on the surface of the membrane. Such groups assist in the adsorption and/or absorption of the water onto the membrane, i.e. "wetting out" of the membrane. Such hydrophilicity is preferred in the filtration of aqueous fluid.

Preferred microporous membranes are those produced from nylon. The term "nylon" is intended to embrace film forming polyamide resins including copolymers and terpolymers which include the recurring amido grouping.

While, generally, the various nylon or polyamide resins are copolymers of diamine and a dicarboxylic acid, or homopolymers of a lactam and an amino acid, they vary widely in crystallinity or solids structure, melting point, and other physical properties. Preferred nylons for use in this invention are copolymers of hexamethylene diamine and adipic acid (nylon 66), copolymers of hexamethylene diamine and sebacic acid (nylon 610), and homopolymers of poly-o-caprolactam (nylon 6). Alternatively, these preferred polyamide resins have a ratio of methylene (CH$_2$) to amide (NHCO) groups within the range about 5:1 to about 8:1, most preferably about 5:1 to about 7:1. Nylon 6 and nylon 66 each have a ratio of 6:1, whereas nylon 610 has a ratio of 8:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, and molecular weights above about 30,000 are preferred. Polymers free of additives are generally preferred, but the addition of antioxidants or similar additives may have benefit under some conditions.

Additionally, any of the hydrophilic type microporous membranes used in commercially available filter elements produced by numerous companies, are potentially suitable for use in the filter elements of this invention, for example, Pall Corp.'s N$_{66}$ ULTIPOR and POSIDYNE N$_{66}$ (nylon), Millipore's DURAPORE (polyvinylidene fluoride), Gelman Sciences Inc.'s METRICEL (esters of cellulose, PVC copolymer) VERSAPOR (acrylic copolymer), Ghia Corp's nylon membrane.

The preferred microporous membranes are produced from nylon by the method disclosed in U.S. Pat. No. 3,876,738 to Marinaccio et al. Another method for producing such membranes is described in European Patent Application No. 0 005 536 to Pall. The entire disclosures of both of these references are incorporated herein by references.

Both of these methods for producing nylon microporous membranes may be described as "quench techniques", i.e. casting or estruding a solution of a film forming polymer onto a substrate and quenching the cast film.

Broadly, Marinaccio et al produces microporous membrane by casting or extruding onto a substrate a casting solution of a film-forming polymer in a solvent system and quenching in a bath comprised of a nonsolvent system for the polymer. The most important parameter responsible for development of micropores in the film (e.g. pore size) according to Marinaccio et al, is the solvent system employed with the polymer and the nonsolvent system used in quenching the film. The selection of the solvent for the polymer is determined by the nature of the polymer material used and can be empirically determined on the basis of solubility parameters described in detail in Marinaccio et al.

The casting solution for forming the preferred nylon microporous membrane is a nylon polymer in a solvent system for the polymer. The solvents which can be used with alcohol soluble nylons include solvents such as lower alkanols, e.g. methanol, ethanol and butanol, and mixtures thereof. It is known that nonalcohol soluble nylons will dissolve in solvents of acids, for example, formic acid, citric acid, acetic acid, maleic acid and similar acids. The nylon solutions after formation are diluted with a nonsolvent for the nylon which is miscible with the nylon solution. Dilution with non-solvent may, according to Marinaccio et al, be effected up to the point of incipient precipitation of the nylon. The nonsolvents are selected on the basis of the nylon solvent utilized. For example, when water miscible nylon solvents are employed, water can be the nonsolvent. Generally, the nonsolvent can be water; methyl formate; aqueous lower alcohols, such as methanol and ethanol; polyols such as glycerol, glycols, polyglycols, and ethers and esters thereof; and mixtures of the aforementioned.

The aforementioned Pall application describes another similar method which may be used for the conversion of nylon polymer into nylon microporous membrane. Broadly, Pall provides a process for preparing skinless hydrophilic alcohol-insoluble polyamide resin from a polyamide casting solution. The casting solution is formed by inducing nucleation of the solution by the controlled addition of a nonsolvent for the polyamide resin to obtain a visible precipitate of polyamide resin particles.

The casting solution, e.g. whether that of Marinaccio et al or Pall, is then spread on a substrate, i.e. reinforcing web or non-porous substrate, to form a thin film thereon. The cast film is then contacted with a quenching bath comprising a non-solvent system for the polymer for a time sufficient to form micropores in the film. The preferred quench bath for forming a nylon microporous membrane comprises a nonsolvent system of methanol and water or formic acid and water.

These preferred nylon membranes, i.e. described in Marinaccio et al and Pall, are characterized by an isotropic structure, having a high effective surface area and a fine internal microstructure of controlled pore dimensions with narrow pore size distribution and adequate pore volume. For example, a representative 0.22 micron rated nylon 66 membrane (polyhexamethylene adipamide) exhibits an Initial Bubble Point (IBP) of about 45 to 50 psid, a Foam All Over Point (FAOP) of about 50 to 55 psid, provides a flow of from 70 to 80 ml/min of water at 5 psid (47 mm. diameter discs), has a surface area (BET, nitrogen adsorption) of about 13 $m^2/g$ and a thickness of about 4.5 to 4.75 mils.

In general, the microporous filter membrane will be cast at thicknesses in the range of from about 1 mil to about 20 mils, preferably from about 1 to about 10 mils (wet thickness). After the polymer solution is cast and quenched, the membrane is removed from the quench bath and substrate upon which it was cast and then washed.

The washed membrane is then, preferably, laminated to another washed membrane, or optionally laminated to a web by methods well known in the art, to form a reinforced laminated filtration membrane. A unique reinforced membrane is described and claimed in U.S. Ser. No. 332,068 to Barnes et al filed Dec. 18, 1981, now abandoned, the entire disclosure of which is incorporated herein by reference. Preferably, lamination is accomplished by passing the plurality of layers juxtaposed upon each other through heated rollers to heat laminate and dry the membranes together. Preferably such drying is under restraint to prevent shrinkage. Drying of the membranes under restraint is described in the Assignee's copending U.S. Ser. No. 201,086 to Repetti, filed Oct. 27, 1980, now abandoned. The entire disclosure of this application is incorporated herein by reference. Generally, any suitable restraining technique may be used while drying, such as winding the membrane tightly about a dry surface, e.g. a drum. Biaxial control is preferred and tensioning the laminated membrane is considered the most preferred.

The final drying and curing temperature for the filtration membrane should be sufficient to dry and cure the membranes. Preferably this temperature is from about 120° C. to 140° C. for minimization of drying time without embrittlement or other detrimental effects to the membranes. The total thickness of the filtration membrane is preferably from about 3 mils to about 30 mils and most preferably about 5 to 15 mils thick (dry thickness).

The filtration membrane may then be rolled and stored under ambient conditions for further processing. After formation of the membrane, it may be treated in accordance with U.S. Ser. No. 314,307, filed Oct. 23, 1981 to Ostreicher et al, now U.S. Pat. No. 4,473,474, to produce a cationically charged modified microporous membrane particularly suitable for the filtration of parenteral or biological liquids; or in accordance with U.S. Ser. No. 268,543, filed May 29, 1981 to Barnes et al, now U.S. Pat. No. 4,473,475, to produce another type cationically charged modified microporous membrane, particularly suitable for the filtration of high purity water, i.e. at least 18 megohm-cm resistivity, required in the manufacture of electronic component. The entire disclosures of both of these applications are incorporated herein by reference.

A method of producing an integrally preformed nonporous sealing area of the filter membrane is by collapsing the pores of the membrane to produce the sealing area. In order to produce the preferred form of the filter membrane, which comprises an elongated porous filtration area longitudinally bordered by substantially non-porous sealing areas, by this method, the apparatus of FIG. 4 may utilized.

Figure 4:
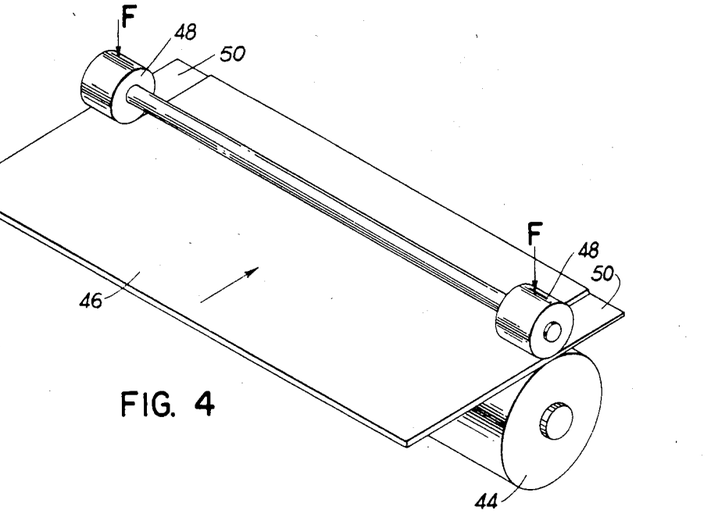
FIG. 4 is a schematic perspective of an apparatus that may be used to prepare a filter membrane by collapsing the pores along the longitudinal borders of the filtration area.

The apparatus broadly comprises a supporting roller (44) over which the microporous membrane (46) passes. The membrane may be produced by any of the methods well known in the art, preferably by the aforementioned Marinaccio et al process.

Crushing rollers (48), each of which has a force (F) applied thereto, are then rolled along the longitudinal borders of the filtration area, collapsing the pores of the membrane against the supporting drum to produce the non-porous areas (50). Such a method of producing the membrane partially and/or totally collapses the pore structure of the membrane in the area between the supporting roller (44) and crushing roller (48). This collapsed pore structure is both strong and flexible. It is possible to collapse nylon membrane to a smooth transparent film at high crushing forces (F), however, this degree of collapse is not necessary to accomplish the objects of this invention. Bubble point tests reveal that the crushed area has a bubble point too high to measure by conventional means, i.e. the area is substantially non-porous. Additionally, the first bubble does not appear at the interface but well within the filtration area indicating that there is no pore damage at the interface.

Figure 4A:
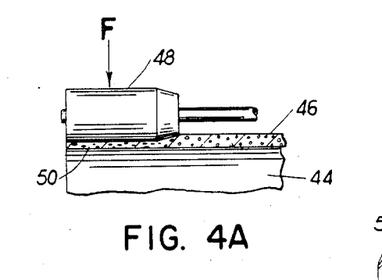
FIGS. 4A and B are two embodiments of crushing rollers used in the apparatus of FIG. 4.
Figure 4B:
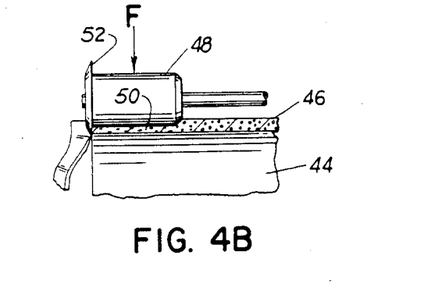

Referring to FIG. 4A, it may be desirable to provide the crushing roller (48) with a taper at the surface which is near the interface between the porous (46) and non-porous areas (50) to prevent a steep fault line between these areas. Optionally, the area which is to be crushed may be cast thicker to provide a filter membrane of constant thickness after crushing. Referring to FIG. 4B, it may also be desirable to provide the roller (48) with a cutting surface (52) on the end to simultaneously trim and crush the membrane.

Figure 5:
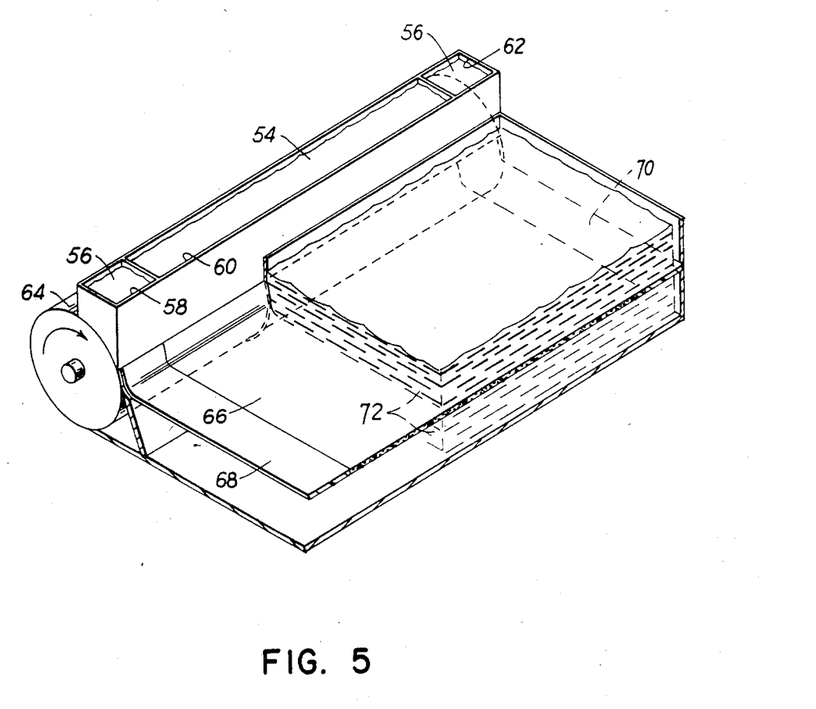
FIG. 5 is a schematic perspective of an apparatus that may be used to prepare a filter membrane by simultaneously casting the filtration area and non-porous sealing area of the membrane.

Another method of producing the preferred elongated microporous filter membrane having an elongated porous filtration area longitudinally bordered by an integrally substantially non-porous sealing area, is by a simultaneous casting and quenching method. Generally, this involves the known methods of producing the membrane by the aforementioned Marinaccio et al and Pall references. Referring to FIG. 5, which depicts an apparatus in schematic which may be utilized to prepare the membrane of this invention, a first (54) and second (56) casting solution are prepared. Each casting solution has an amount of film forming polymer in a solvent system. Both of these casting solutions are simultaneously cast through casting boxes (58,60,62) on to a casting surface (64) to provide respectively, an elongated cast area (66) bordered by two edge cast areas (68, 70), each edge cast area being adjacent to and in contact with longitudinal edges of the elongated cast area. These cast areas are then simultaneously contacted with a quench bath (72), for a time sufficient to form the appropriate micropors in the cast areas. The amount of polymer, the solvent system and non-solvent system are each individually selected to provide the edge areas with a pore size less than the filtration area. Preferably these edge areas are substantially non-porous. As indicated previously, the preferred film forming polymer is nylon.

Preferably, the solvent systems comprise a mixture of at least one solvent and one non-solvent for the polymer. The amount of non-solvent used is preferably not greater than an amount required to induce neucleation of the solution to obtain a visible precipitate, the solvent being formic acid and the non-solvent being selected from the group consisting of methanol, methylformate, water and glycerols. The non-solvent system is preferably a mixture of methanol and water or formic acid and water.

The manner of varying the amount of polymer, solvent systems and non-solvent systems to achieve differing pore size in a membrane, particularly a nylon membrane, are well known in the art from, for example, the aforementioned Marinaccio et al and Pall. Generally, by increasing the ratio of non-solvent to polymer in the casting solution the pore size of the membrane produced will decrease. For example, a casting solution containing 16% by weight nylon, a methanol/nylon ratio of 0.445 and the balance formic acid when cast into a quench bath containing 30% methanol, 2.0% formic acid and 68% water by weight produces a membrane having about 0.2 micron pores. Increasing the methanol/nylon ratio to 0.48, with all other parameters remaining the same, produces a membrane with reduced pore size (See Example IV).

Additionally, the selection of the amount of polymer, solvent and non-solvent systems should be selected so that the characteristics of the interface between the membranes is not deleteriously effected by cross diffusion between the two casting solutions.

A preferred process for making the preferred filter element of this invention (which is included within the generic concept of this invention) is described and claimed in concurrently filed U.S. Ser. No. 383,377, filed on May 28, 1982 by Miller, the entire disclosure of which is incorporated herein by reference. This preferred filter element comprises a hydrophilic nylon microporous filter membrane having a preformed substantially non-porous sealing area of non-porous tape which is heat sealed to the membrane. The filter housing has a hydrophobic thermoplastic sealing surface in thermoplastic sealing relationship with the sealing area. Preferably, as described in detail in this concurrently filed application, the tape is comprised of a layer of polyester coated with heat sealable polyethylene. The apparatus used for applying the tape to the preferred form of the filter membrane is also described in detail in this concurrently filed application. Generally, the preferred process for making this filter element comprises preparing a filter membrane having an elongated porous filtration area by methods well known in the art, and then applying a heat sealable non-porous tape to the longitudinal borders of the filtration area.

This preferred embodiment of the filter element of this invention has the advantages in that the nylon membrane can be utilized with the preferred filter housing, i.e. polypropylene, is simple to manufacture and there are no solvents employed to adhere the tape to the membrane or the filter housing to the membrane. The tape also adds to the structural rigidity of the membrane permitting, for example, lower temperatures for softening the end caps providing a savings in energy and decreased injury to the membrane.

For so called sterile filtrations, involving biological liquids, the filter element is santiized or sterilized by autoclaving or hot water flushing prior to use. The filtration element and membrane of this invention are resistant to this type treatment, and retain their integrity under such conditions.

Having now generally described this invention, the invention will become better understood by reference to specific Examples. These Examples are included herein for the purposes of illustration only and are not intended to be limiting of the invention unless so specified.

By the use of the term "preformed" it is meant that the substantially non-porous area is formed on air in the flat membrane.

By the use of the term "integrally preformed" it is meant that the substantially non-porous area is monolithic with the porous filtration area and consist essentially of the same organic polymeric material as the porous filtration area.

EXAMPLES

The following are the measurement and test procedures utilized in all the Examples.

Thickness

The dry membrane thickness was measured with a ½ inch (1.27 cm) diameter platen dial indicator thickness gauge. Gauge accuracy was ±0.00005 inches (±0.05 mils).

Initial Bubble Point (IBP) and Foam-All-Over Point (FAOP) Tests

A 47 mm diameter disc of the membrane sample is placed in a special test holder which seals the edge of the disc. Above the membrane and directly in contact with its upper face, is a perforated stainless steel support screen which prevents the membrane from deforming or rupturing when air pressure is applied to its bottom face. Above the membrane and support screen, the holder is provided with an inch deep cavity into which distilled water is introduced. A regulated air pressure is increased until a first stream of air bubbles is emitted by the water wetted membrane into the quiescent pool of water. The air pressure at which this first stream of air bubbles is emitted is called the Initial Bubble Point (IBP)—see ASTM F316-7.

Once the Initial Bubble Point pressure has been determined and recorded, the air pressure is further increased until the air flow thru the wetted membrane sample, as measured by a flow meter in the line between the regulator and the sample holder, reaches 100 cc/min. The air pressure at this flow rate, is called Foam-All-Over-Point (FAOP).

Flow Rate Test

A 47 mm diameter disc of the membrane sample is placed in a testing housing which allows pressurized water to flow thru the membrane. Prefiltered water is passed thru the membrane sample at a pressure differential of 5 psid. A graduated cylinder is used to measure the volume of water passed by the membrane sample in a one minute period.

EXAMPLE I

PREPARATION OF MICROPOROUS MEMBRANE

(0.2 MICRONS)

A representative nylon 66 membrane having a nominal surface area of about 13 m²/g and a nominal pore size rating of 0.2 microns was prepared by the method of Marinaccio et al, U.S. Pat. No. 3,876,738, utilizing:

(1) a casting solution of approximately 16 percent by weight nylon 66 (Monsanto Vydyne 66B), and the proper mixture of solvent formic acid and non-solvent methanol (see Table I) to produce the desired minimum Initial Bubble Point of 42 psi, at the necessary dope mixing temperatue, time, pressure, etc. (as required by the method of Marinaccio et al);

(2) a quench bath composition of 30% methanol, 2.0% formic acid and 68% water by weight (regenerated as required by the method of Knight et al, U.S. Pat. No. 3,928,517);

(3) a casting speed of 96 inches/min on a 30" diameter casting drum; and (4) a quench bath temperature of 23° C.

The membrane was produced by casting the casting solution onto the drum just under the surface of the quench bath approximately 4.5 mils thick as cast wet, to obtain a dry single layer of approximately 2.5 mils thick. The membrane was allowed to separate from the drum at about 180° of arc from the point of application and was guided out of the quench bath and into a series of high purity water rinsing zones. The wet membrane was then slit from the cast 40" width down to two 15" widths, and taken up on separate hollow cores in lengths of 200 feet. These outer membrane layers may be stored wet in this fashion for several days before subsequent processing. The Membrane Characteristics for these layers are obtained after drying a double-layered sample of this membrane under restraint conditions as required by the method of Repetti, U.S. Ser. No. 201,086, filed Oct. 27, 1981.

TABLE 1

| Casting Solution Composition | |
|---|---|
| Nylon | 16.06 wt. % |
| Formic Acid | 77.01 wt. % |
| Methanol | 6.93 wt. % |
| Casting Solution Mixing Conditions | |
| Temperature | 30° C. |
| Time | 5 hrs. |
| Pressure psig | 1.0 psig |

TABLE 1-continued

| Membrane Characteristics | | | |
|---|---|---|---|
| IBP (psi) | FAOP (psi) | THICKNESS (mils) | Q (cc/min.) |
| 42.3 | 51.5 | 5.38 | 81.3 |

EXAMPLE II

PREPARATION OF MICROPOROUS MEMBRANES

(0.45 MICRONS)

A representative nylon 66 membrane having a nominal surface pore size rating of 0.45 microns was prepared by the same method described in Example I. Changes in the casting solution composition and mixing conditions are noted in Table II.

TABLE II

| Casting Solution Composition | |
|---|---|
| Nylon | 16.15 wt. % |
| Formic Acid | 77.45 wt. % |
| Methanol | 6.40 wt. % |
| Casting Solution Mixing Conditions | |
| Temperature | 30° C. |
| Time | 5.0 hrs. |
| Pressure psig | 1.0 psig |

| Membrane Characteristics | | | |
|---|---|---|---|
| IBP (psi) | FAOP (psi) | THICKNESS (mils) | Q (cc/min.) |
| 29.7 | 34 | 5.83 | 170 |

EXAMPLE III

PREPARATION OF MICROPOROUS MEMBRANES

(0.65 MICRONS)

A respresentative nylon 66 membrane having a nominal pore size rating of 0.65 microns was prepared by the same method described in Example I, except that the membrane was produced at a casting surface speed of 30 inches/min. on a casting drum of 12.5 inch diameter. The wet thickness of a sheet was 5.5 mils. Changes in the casting solution composition and mixing conditions are noted in the Table III.

TABLE III

| Casting Solution Composition | |
|---|---|
| Nylon | 16.00 wt. % |
| Formic Acid | 78.04 wt. % |
| Methanol | 5.96 wt. % |
| Casting Solution Mixing Conditions | |
| Temperature | 30° C. |
| Time | 3 hrs. |
| Pressure psig | 0.0 psig |

| Membrane Characteristics | | | |
|---|---|---|---|
| IBP (psi) | FAOP (psi) | THICKNESS (mils) | Q (cc/min.) |
| 16.0 | 19.5 | 3.90 | 620 |

EXAMPLE IV

SIMULTANEOUS CASTING AND QUENCHING

Samples of the preferred membrane of this invention were prepared on a device similar to that shown in FIG. 5. The casting solutions used were as follows:

| Conventional 0.2 micron Membrane Casting Solution | "Non-Porous" Edge Casting Solution |
|---|---|
| Nylon - 16 wt. % Methanol/Nylon = 0.445 Formic Acid = balance Quench Bath - see Example 1 | Nylon - 16 wt. % Methanol/Nylon = 0.48 Formic Acid = balance |

The membrane was cast so that half of the sheet width was cast from the conventional casting solution while the other half was cast from the modified "Non-porous" casting solution. The separator in the casting box was relieved so that the two solutions could contact each other just as they moved under the casting knife into the quench bath.

The resulting membrane sheet exhibited a sharp visual demarcation between the halves. The half cast from the Conventional Casting Solution was white and opaque. The half cast from the Non-Porous Casting Solution was translucent. There were no apparent mechanical discontinuities between the two adjacent halves except the translucent half was slightly (0.2 to 0.3 mils) thinner. Bubble point tests were conducted on hoop dried samples, with results as follows:

White, opaque "Conventional Casting Solution half:
  IBP=49 psi
  FAOP=54 psi.
Translucent "modified non-porous" half: no indication of any bubbles up to 90 psi (limit of test apparatus)
Interface between halves: IBP=54 psi.

These results indicate that the desired membrane sheet structure was obtained; namely, a conventional porous 0.2 um membrane (IBP >45) with a non-porous edge (IBP 90 psi), with no structural defects or bubble point depression at the interface, utilizing a simultaneous casting and quenching technique.

The use of such a non-porous edged membrane in the fabrication of pleated filter cartridges should eliminate all of the problems of bubble point depression that occur at the interface between the membrane and the normally hydrophobic end cap and/or hydrophobic adhesive.

EXAMPLE V

COLLAPSING PORES

A dry double layer of nylon membrane was prepared pursuant to Example I. A sample of the membrane was crushed between a glass plate and a stainless steel roller bearing by moving the smooth surfaced roller across the stationary membrane laid upon the glass plate. By varying the pressure of the roller bearing on the membrane, different degrees of crushing were obtained. A high pressure turns the white, opaque membrane to a clear transparent state.

The crushed area had an IBP of over 90 psi. The interface between the crushed and non-crushed area was bubble point tested (IBP, FAOP). The non-crushed membrane area had an IBP of 42 psi. The first bubble did not occur at the interface between the crushed and non-crushed areas but well within the non-crushed area. The original membrane prior to crushing had an IBP of 43.8 psi, avg. thickness of 5.07 mils, FAOP of 47.7 psi, Flow Rate Avg. of 87.7 ml/min. @ 5 psid in a 47 mm sample holder.

What is claimed is:

1. A process for preparing an organic polymeric microporous filter membrane having a first porous film area and a second adjacent film area wherein the pore size of the second film area is less than the pore size of the first film area, the process comprising:
   (a) preparing a first casting solution of an amount of a film forming polymer in a first solvent system;
   (b) preparing a second casting solution of an amount of the film forming polymer in a second solvent system;
   (c) simultaneously casting the first and second casting solution onto a casting surface to provide, respectively, a first cast area and a second adjacent cast coated area in contact therewith;
   (d) simultaneously contacting the cast areas with a quenching bath comprising a non-solvent system for the polymer for a time sufficient to form the appropriate micropors in the cast coated areas to thereby form, respectively, the first and second film areas;
   wherein the amount of polymer and the solvent and non-solvent systems are each individually selected to provide the second film area with a pore size less than the first film area.

2. The process of claim 1, wherein the second porous area is substantially non-porous.

3. A process for preparing a hydrophilic organic polymeric microporous filter membrane having an elongated porous filtration area longitudinally bordered by two edge areas, wherein the porosity of the edge areas are less than the pore size of the filtration area, the process comprising:
   (a) preparing a first casting solution of an amount of film forming polymer in a first solvent system;
   (b) preparing a second casting solution of an amount of the film forming polymer in a second solvent system;
   (c) simultaneously casting the first and second casting solutions onto a casting surface to provide, respectively, an elongated cast area bordered by two edge cast areas, each edge cast area adjacent to and in contact with the longitudinal edge of the elongated cast area;
   (d) simultaneously contacting the cast areas with a quenching bath comprising a non-solvent system for the polymer for a time sufficient to form the appropriate micropores in the cast areas to thereby form respectively, the filtration and edge areas;
   wherein the amount of polymer and the solvent and the non-solvent systems are each individually selected to provide the edge area with a pore size less than the filtration area.

4. The process of claim 3, wherein the edge area is substantially non-porous.

5. The process of claim 3, wherein the film forming polymer is nylon.

6. The process of claim 5, wherein:
   (a) the solvent systems comprise a mixture of at least one solvent and one non-solvent for the polymer, the amount of non-solvent being no greater than an amount required to induce nucleation of the solution to obtain a visible precipitate, said solvent being formic acid and said non-solvent being selected from the group consisting of methanol, methyl formate, water and glycerol; and
   (b) the non-solvent system is a mixture of methanol and water or formic acid and water.

7. A process for preparing a hydrophilic organic polymeric microporous filter membrane having an elongated porous filtration area longitudinally bordered by substantially non-porous areas, the process comprising:

(a) preparing the filter membrane having the elongated porous filtration area; and (b) collapsing the pores along the longitudinal borders of the filtration area.

8. The process of claim 7, wherein the organic polymer is nylon.

9. The process of claim 7, wherein the organic polymer is polyhexamethylene adipamide.

10. The process of claim 7, further comprising forming the membrane into a cylinder having the substantially non-porous areas at each end of the cylinder.

11. The process of claim 7, further comprising pleating the membrane transversely to its length and forming the pleated membrane into a cylinder having the substantially non-porous areas at each end of the cylinder.

12. A process for producing a filter element comprising:

(a) preparing the cylindrical pleated membrane by the process of claim 11, and (b) applying preformed end caps to the membrane by:

(i) heating an inside face of a thermoplastic end cap to a temperature sufficient to soften but not liquify a sufficient amount of the end cap to form a thermoplastic seal with the non-porous area at each end of the cylinder;

(ii) embedding all of the edges of one end of the cylinder into the softened end cap;

(iii) hardening the softened end cap material thereby forming a thermoplastic sealing relationship between the sealing surface of the end cap and the non-porous area to thereby form a leak-proof seal.

13. A process for producing a filter element comprising:

(a) preparing the cylindrical pleated membrane by the process of claim 11 and (b) applying preformed end caps to the membrane by:

(i) heating an inside face of a thermoplastic end cap to a temperature sufficient to at least soften a sufficient amount of the end cap to form a thermoplastic seal with the non-porous area at each end of the cylinder;

(ii) embedding all of the edges of one end of the cylinder into the softened end cap;

(iii) hardening the at least softened end cap material thereby forming a thermoplastic sealing relationship between the sealing surface of the end cap and the non-porous area to thereby form a leak-proof seal.

14. The process of claim 13, wherein the end caps are hydrophobic.

* * * * *